United States Patent [19]

Stewart

[11] 3,811,225

[45] May 21, 1974

[54] SLIDABLE DOOR FASTENER FOR WEATHERPROOF HOUSING

[75] Inventor: James R. Stewart, San Jose, Calif.

[73] Assignee: GTE Lenkurt Incorporated, San Carlos, Calif.

[22] Filed: Nov. 1, 1972

[21] Appl. No.: 302,965

[52] U.S. Cl. .................................... 49/463, 220/41
[51] Int. Cl. .............................................. E06b 3/32
[58] Field of Search ....... 49/62, 404, 428, 431, 433, 49/459, 463; 220/41

[56] References Cited

UNITED STATES PATENTS

| | | | |
|---|---|---|---|
| 3,278,009 | 10/1966 | Crump, Jr. | 220/41 X |
| 3,414,159 | 12/1968 | Murr | 220/41 |

FOREIGN PATENTS OR APPLICATIONS

| | | | |
|---|---|---|---|
| 894,286 | 4/1962 | Great Britain | 49/463 |

*Primary Examiner*—Kenneth Downey
*Attorney, Agent, or Firm*—Leonard R. Cool; Russell A. Cannon; T. C. Jay, Jr.

[57] ABSTRACT

Similarly shaped curved surfaces on projecting edges of the top and sides of a door and an opening in a housing mate together to form an essentially water-tight seal around the top and sides of the opening when the door is slidably mounted on the housing. The spacings between the side edges at the bottom of the door and opening are less than those at the tops thereof to facilitate slidably removing the door from the housing without raising the door to its full height.

3 Claims, 10 Drawing Figures

SLIDABLE DOOR FASTENER FOR WEATHERPROOF HOUSING

BACKGROUND OF THE INVENTION

This invention relates to fasteners for joining two parts together, and more particularly to a slidable fastener for joining a door to a weatherproof housing.

The method of concentrated building of residential and recreational homes in subdivisions causes large demand for telephone services in isolated and scattered areas. An economical method of satisfying this demand is to locate multiplex equipment in the subdivision to enable communication of a large number of telephone subscriber terminals over a small number of physical telephone wires that are connected to a telephone central office. Multiplex equipment for the subscriber terminals is stored in a weatherproof housing that protects it from the elements. Existing housings employ hinged doors with deformable seals between adjacent surfaces of the door and housing to shut out rain. This type of closure is relatively expensive.

An object of this invention is the provision of an improved, economical, and simplified fastener for the door on a weatherproof housing.

BRIEF DESCRIPTION OF DRAWINGS

This invention will be better understood from the following detailed description of a preferred embodiment thereof, together with the drawings in which.

DESCRIPTION OF THE PREFERRED EMBODIMENTS

Figure 1:
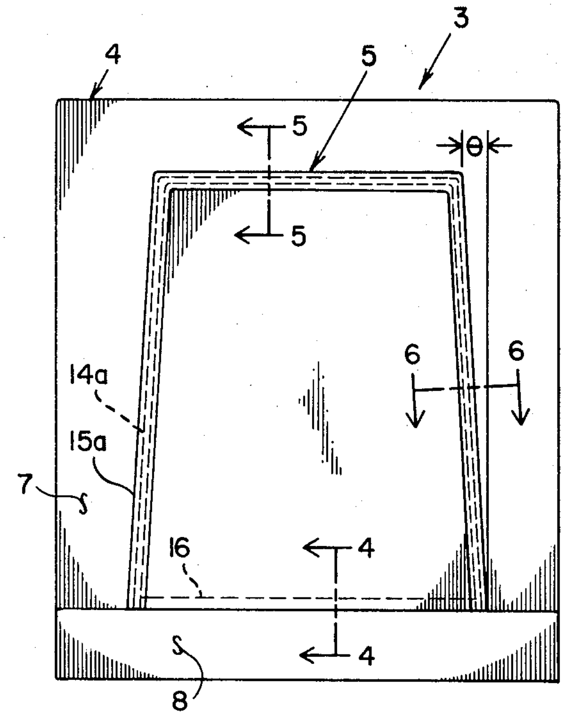
FIG. 1 is a front view of an integrally molded housing and door assembly with a fastener embodying this invention.
Figure 3:
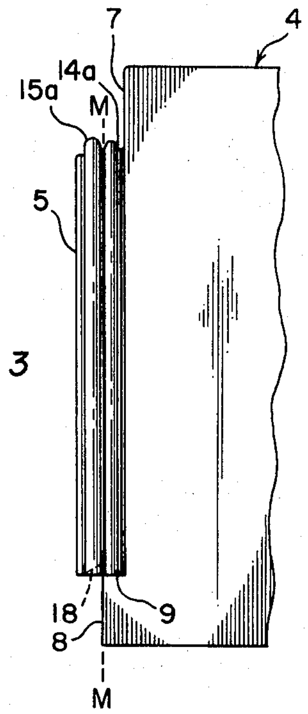
FIG. 3 is a right side view of the assembly in FIG. 1, with the housing partially broken away.
Figure 2:
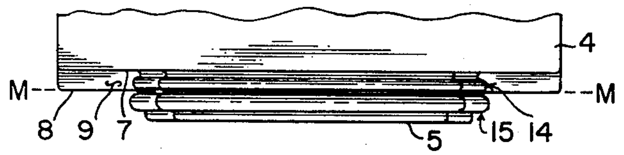
FIG. 2 is a top view of the assembly in FIG. 1 with the housing partially broken away.

In the preferred embodiment of this invention in FIGS. 1 – 6, the integrally molded part 3 comprises a rectangularly shaped enclosure or housing 4 having a door 5 formed as a projection on the front thereof. The housing 4 has upper and lower front walls 7 and 8, respectively, that are offset from each other to form a shoulder 9 therebetween (see FIGS. 2 and 3). The housing has an opening in the upper wall 7 that is defined by the edges 11 thereof (see FIGS. 5 – 7).

The door 5 and fastener embodying this invention are formed as a projection on wall 7. The fastener comprises first slide bars 14 on wall 7 and second slide bars 15 on door 5 (see FIGS. 1 – 3). The slide bars 14 and 15 preferably extend continuously around the top and sides of the opening 11 and door 5, respectively. The side and top sections of the slide bars are essentially straight. In accordance with this invention, both of the side slide bars 14 and 15 are angled or tapered in at an angle Θ toward the top of the door (see FIG. 1).

Figure 4:
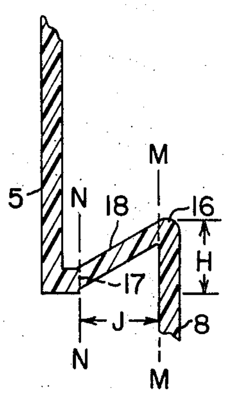
FIG. 4 is a greatly enlarged section view taken along lines 4—4 in FIG. 1 and showing the cross-sectional shape of the integrally molded bottom surface of the door and its attachment to the front of the housing.
Figure 5:
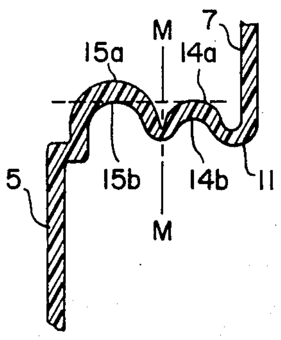
FIG. 5 is a greatly enlarged section view taken along lines 5—5 in FIG. 1 and showing the cross-sectional shape of the integrally molded top slides on the door and front of the housing.
Figure 6:
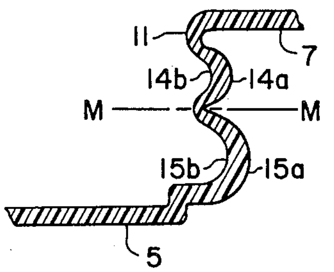
FIG. 6 is a greatly enlarged section view taken along lines 6—6 in FIG. 1 and showing the cross-sectional shape of the integrally molded side slides of the door and front of the housing.
Figure 7:
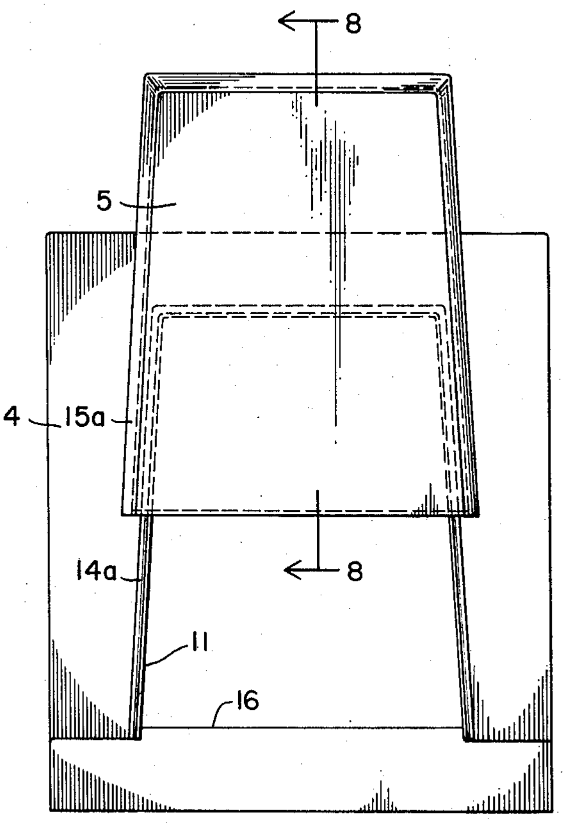
FIG. 7 is an exploded view of the housing with the door shown in position for the troughs thereon to be slid over the ridges on the face of the housing.

The slide bars 14 are extensions of the side and top edges 11 of the opening in the upper wall 7 (see FIGS. 5 and 6). These slide bars 14 project upwardly from shoulder 9 and extend over the depth of the latter (see FIGS. 2 and 3). The slide bars 15 are extensions of the edges of door 5 and are joined to the slide bars 14 along the parting line M—M which extends along the face of the lower wall 8 (see FIG. 4). As shown in FIGS. 1, 4, and 7, the top edge 16 of wall 8 extends a distance H above the surface of shoulder 9. The edge 17 on the bottom of door 5 is spaced a distance J from the lower wall 8 by the slanted member 18. The spacing J is preferably substantially equal to the spacing of the parting line M—M from the upper wall 7 of the housing.

The shapes of the inner and outer surfaces of slide bars 15 and 14, respectively, are complementary so that they mate together. More particularly, the outer surfaces of the top and side slide bars are convex to form outer ridges 14*a* and 15*a* that are directed away from the opening 11 in the housing, see FIGS. 5 and 6. The inner surfaces of the slide bars are concave to form inner troughs 14*b* and 15*b*. The radii of curvature of the ridge 14*a* and trough 15*b* are approximately equal for mating together when the door 5 is employed to close the opening 11 as is described more fully hereinafter. The points of zero slope on the surfaces 14*a* and 15*b* of the top slides are preferably aligned in the molded part as is shown by the dashed line in FIG. 5.

The door 5 and its associated slide bar 15 are separated from housing 4 and its associated slide bar 14 by cutting along the parting lines M—M with a saber saw or similar cutting tool. The slanted member 18 (see FIGS. 3 and 4) is also removed from the door by cutting along the parting line N—N in FIG. 4 and along the inner surfaces 15*b* of the slide bars 15 on the sides of door 5.

Figure 9:
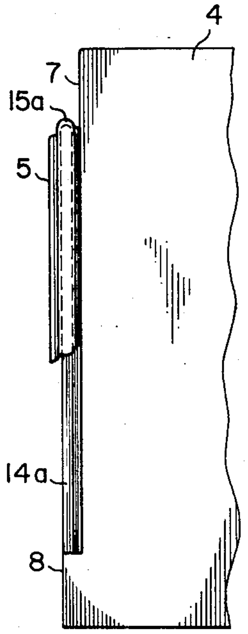
FIG. 9 is a right side view of the assembly in FIG. 7 with the door in the closed position on the housing, with the door partially cut away to show the interrelationship of the mating surfaces on the door and housing, and with the housing partially broken away.
Figure 8:
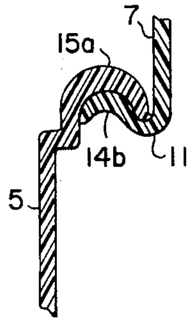
FIG. 8 is a greatly enlarged section view taken along lines 8—8 in FIG. 7 with the door in a closed position on the housing and showing how the mating ridge and trough surfaces on the door and housing come together to form an essentially watertight seal.

In order to close the opening 11 in the housing, the door 5 is raised vertically in the air as is shown in FIG. 7, and the side troughs 15*b* of the door are fitted over associated side ridges 14*a* of the housing. The door is then forced downward, being located by the fit of the ridges in the troughs, until the top trough 15*b* mates securely with the top ridge 14*a* (see FIG. 8). The slides 14 and 15 are interlocking in the sense that downward motion of door 5 is constrained by the top of slide 14 when the two slides are forced together as is shown in FIGS. 8 and 9. In this position, the bottom edge 17 of the door contacts the lower wall 8 of the housing to close the opening 11 (see FIG. 9).

The housing 4 and door 5 may be molded as a single part 3, as is shown in FIGS. 1 – 6, by the rotational molding process which is described in Rotational Molding by J. Arnold Nickerson, *Modern Plastics Encyclopedia*, Vol. 48, No. 10A, page 424, October 1971, McGraw-Hill Inc., New York, N.Y. This molded door and housing are preferably made of a plastic material such as cross-linked polyethylene. Alternatively, the housing and door may be fabricated separately.

A weatherproof housing that was built and tested has a door 5 that is 34 inches high, the top and bottom of the door standing 46 inches and 12 inches, respectively, above the ground when the door is in the closed position. This means that the top of the door 5 must be raised vertically at least 80 inches, or almost 7 feet, in the air to remove it from housing 4 if the side slide bars are parallel to each other and perpendicular to the ground. In accordance with this invention, the side slide bars on the door and housing are tapered in at the top thereof to facilitate removal of door 5 from housing 4 without raising the door to its full height. In this housing, the side slide bars were each tapered in at an angle Θ of approximately 3° which enabled the 34 inches high door to be removed from the housing after raising it less than 9 inches rather than the 34 inches that would be required if the side slide bars are parallel to each other and perpendicular to the ground.

Figure 10:
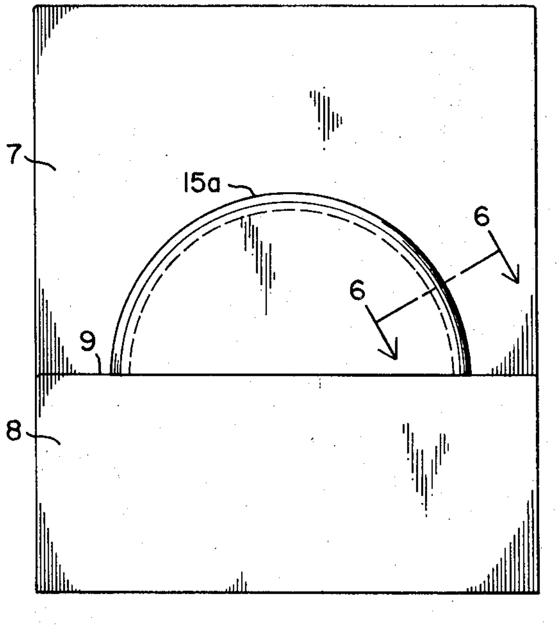
FIG. 10 is a front view of another housing embodying this invention.

A housing embodying this invention in which the slides on the door and housing are curved instead of straight is shown in FIG. 10. Also, the cross-section of the projecting edges of door 5 and opening 11 may both be triangular, rectangular, or some other similar and convenient shape.

What is claimed is:

1. An essentially rectangular unitary container comprising:

an essentially rectangular enclosure including three pairs of walls, with one wall having an essentially rectangular opening therein over at least a portion thereof;

a part for being slidably joined to said enclosure for closing the opening therein;

a pair of exterior surfaces formed on the outside of said enclosure adjacent two opposing edges of said opening, said enclosure surfaces being tapered with the ends thereof adjacent one end of the opening being spaced farther apart than the ends thereof that are adjacent the other end of the opening; and a pair of opposing surfaces formed on said part along two opposing lines thereon that are congruous with said enclosure surfaces;

associated ones of said opposing part surfaces and enclosure surfaces having complimentary shapes that slidably mate and interlock over the lengths thereof for fastening said part and enclosure together when the former is slid over the latter;

said surfaces and magnitudes of said tapers thereon being sufficient for slidably removing said part from said enclosure upon moving the former part less than one half of the lengths of said surfaces thereon.

2. In a weatherproof housing having an opening in one wall thereof and a door for closing the opening, a slidable fastener for joining the door to the one wall in a sealing relationship, comprising exterior surfaces formed on the outside of the one wall around the two sides and top of the opening, both of the exterior wall surfaces on the sides of the opening being tapered in with the ends thereof that are adjacent the bottom of the opening being spaced farther apart than the ends thereof that are adjacent the top of the opening, and surfaces formed on the door around the two sides and top thereof, said side surfaces on the door being tapered in with the ends thereof that are adjacent the bottom of the door being spaced farther apart than the ends thereof that are adjacent the top of the door, the magnitude of the tapers on said side surfaces of both the one wall and the door being the same, said surfaces on the door and the one wall having complementary shapes that slidably mate and interlock in a sealing relationship over the lengths thereof for fastening the door onto the housing, said surfaces and the magnitudes of said tapers being sufficient to slidably remove the door from the one wall by moving the door less than one half of the length thereof.

3. The fastener according to claim 2 wherein associated mating surfaces are ridges and troughs, said side ridges and side troughs being angled inward in the direction of the top of the housing for facilitating removal of the door from the housing.

* * * * *